Nov. 26, 1957 J. R. HOLLINS 2,814,667
VEHICLE LAMP MOUNTING
Filed Sept. 25, 1953

INVENTOR
Jesse R Hollins
BY
ATTORNEY

United States Patent Office 2,814,667
Patented Nov. 26, 1957

2,814,667

VEHICLE LAMP MOUNTING

Jesse R. Hollins, Brooklyn, N. Y.

Application September 25, 1953, Serial No. 382,311

4 Claims. (Cl. 174—138)

This invention relates to vehicle lamps and, more particularly, to a novel moisture-proof, grease-proof, and dirt-proof mounting for vehicle signal or marker lamps.

In addition to the usual headlamps, parking lamps, tail lamps and license plate lamps, many vehicles are provided with additional signal or marker lamps. In the case of passenger vehicles, these lamps are usually recessed into the fenders or body so as to be substantially "flush mounted." However, on commercial vehicles, particularly the larger size trucks and tractor-trailer combinations, the signal and marker lamps are mounted in projecting relation on the fenders, body, or bumpers.

Generally, these truck-mounted signal or marker lamps comprise a lamp casing having a hollow, threaded mounting stud projecting therefrom. This stud is inserted through a mounting hole in the vehicle and secured in position by a nut and lock-washer assembly threaded onto the stud, a suitable gasket being interposed between the lamp casing and the vehicle outer surface. The hollow stud serves as a conduit for leading one or more circuit conductors into the lamp casing. Between the stud inner end and the lamp control switch, the conductors or cables are enclosed in a protective sleeve or tube of flexible construction, generally of woven fiber or the like.

The present mountings of such lamp are susceptible to the entrance of moisture, grease, dirt and the like into the protective sleeve and into the lamp casing through the hollow stud. The vulnerable point for entry of such foreign matter is at the juncture between the protective sleeve and the hollow stud. While attempts have been made to provide a sealed juncture between the sleeve and the stud, they have not been commercially satisfactory. Of course, such foreign matter has a deleterious effect on the lamp and its circuit conductors.

The present invention is directed to a novel, simple, and inexpensive sealed mounting for such lamps, providing a dust, moisture and grease sealed connection between the lamp mounting stud and the protective sleeve for the circuit conductor. To this end, a cup-shaped or dished washer, having a radial flange spaced from its base, is mounted on the stud between the lock-washer and nut assembly and the underside of the vehicle lamp mounting surface. This cup-washer has an inner diameter sufficiently large to receive the lock-washer and nut and permit a socket wrench to be used on the nut. The base of the cup washer engages the vehicle mounting surface so that the outwardly projecting radial flange is spaced from such surface.

Associated with the cup washer is a sealing nipple or housing of flexible, resilient, elastic material, such as natural or synthetic rubber or the like. This nipple is generally cup shaped, and has an inner diameter substantially less than the outer diameter of the flange on the dished washer. At a zone spaced from its rim by a distance substantially equal to or slightly greater than the distance between the washer flange and the vehicle mounting surface, the inner surface of the nipple is formed with a circumferential groove arranged to receive and tightly grip the flange of the washer. When the nipple is stretched over the dished washer to snap the flange into the groove, a tight, sealing enclosure is provided enclosing the dished washer, lock-washer and nut, the rim of the nipple being in tight sealing engagement with the mounting surface.

The sealing nipple has a tubular extension of reduced diameter projecting laterally therefrom, the inner diameter of such extension being less than the outer diameter of the protective sleeve for the circuit conductors. The sleeve is force-fitted into this elastic extension, thus providing a completely sealed connection between the lamp casing and the protective sleeve.

For an understanding of the invention principles, reference is made to the following description of a typical embodiment thereof as illustrated in the accompanying drawing.

Figure 1:
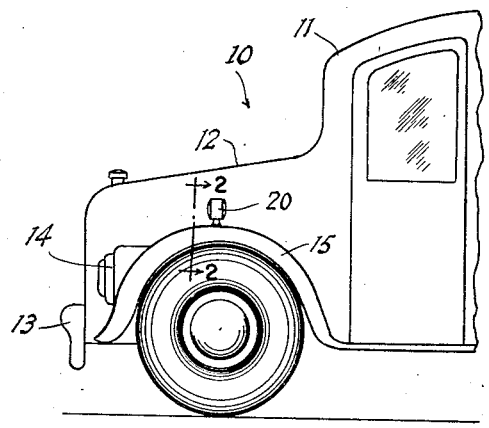
Fig. 1 is a partial side elevation view of a commercial motor vehicle having a signal or marker lamp mounted on a fender.

Referring to Fig. 1, a commercial motor vehicle 10 is illustrated as having a cab 11, hood 12, bumper 13, a headlamp 14, and a left front fender 15 on which lamp 14 is mounted, preferably in flush relation. On the upper surface of fender 15, and projecting upwardly therefrom, is mounted a signal or marker lamp 20, the illustrated lamp 20 including a cylindrical lamp casing or housing 21 having a front aspect or lens 22 and a rear aspect or lens 23, as best seen in Fig. 3.

Secured to the underside of casing 21 by rivets 24 or the like is a cup shaped base 25, the base having a securing flange 26 conformingly fitting casing 21. Projecting axially from base 25 is a hollow threaded stud 30 arranged to be inserted through a mounting hole 16 in fender 15, a sealing washer or gasket 27 being interposed between base 25 and the outer surface 17 of fender 15. In the usual mounting arrangement, lamp 20 is secured in position by a nut 31 threaded on stud 30, a lock washer 32 being interposed between nut 31 and the undersurface 18 of fender 15. The conductor or cable 34 for one or more lamps mounted in casing 21 is brought out through stud 30.

Figures 2, 3:
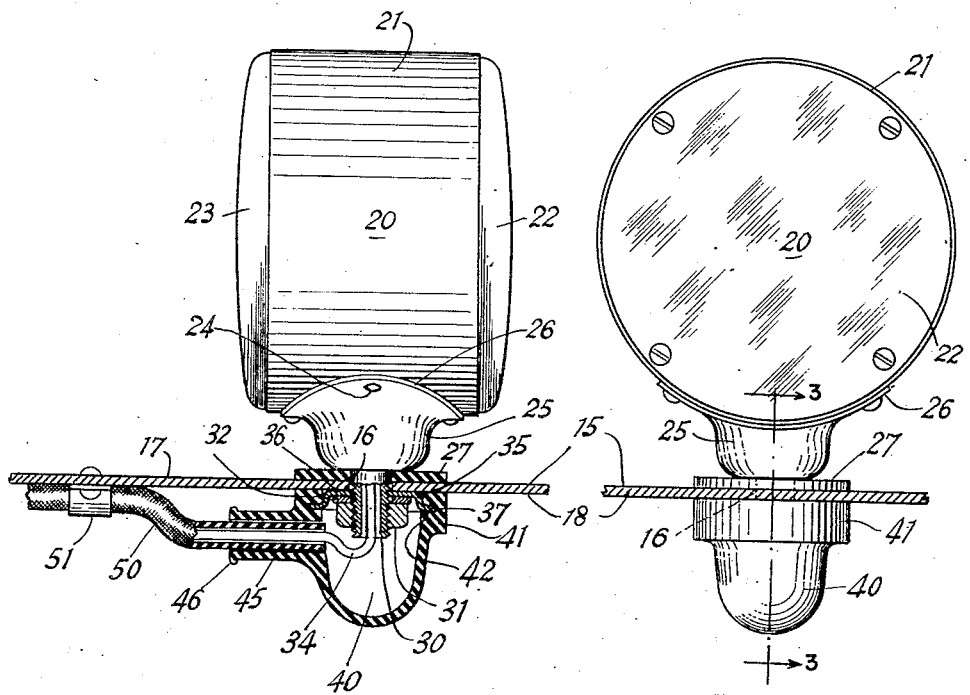
Fig. 2 is a transverse sectional view, on the line 2—2 of Fig. 1, illustrating in elevation the invention mounting seal.
Fig. 3 is a sectional view on the line 3—3 of Fig. 2.

In accordance with the present invention, this usual mounting arrangement is modified, as shown in Figs. 2 and 3, by interposing a relatively thin dished or cup-shape metallic washer 35 between lock washer 32 and undersurface 18 of fender 15. Washer 35 has a base 36 engaging surface 18 and an outwardly projecting radial flange 37 spaced axially from base 36. The inner diameter of washer 35 is sufficiently large to receive a socket wrench or the like for tightening nut 31.

Associated with washer 35 is a generally cup shaped nipple 40, of flexible, resilient, and elastic material such as natural or artificial rubber or the like, having a relatively thick rim portion 41 and a reduced extension 45 projecting laterally therefrom for a purpose to be described. Rim portion 41 has a circumferential groove 42 in its inner surface, groove 42 being spaced from the outer edge of nipple 40 by a distance substantially equal to or slightly greater than the axial depth of washer 35. The inner diameter of rim portion 41 is substantially less than the outer diameter of flange 37, which, in turn, is substantially equal to the base diameter of groove 42.

Extension 45 has a thickened rim or lip 46, and its inner diameter is preferably slightly less than the outer diameter of protective sleeve 50 for cable 35. Sleeve 50 is usually a flexible element of woven fiber or the like.

To assemble the invention mounting, gasket 27 is slipped over stud 30 and the stud is inserted through hole 16. Washer 35 and then lock-washer 32 are placed on stud 30 beneath fender 15, and nut 31 is threaded onto the stud to clamp the washers firmly against fender surface 18. Cable 34 is then threaded into nipple 40 and out through extension 45. Rim portion 41 of nipple 40 is then stretched to insert flange 37 into circumferential groove 42, making a tight seal between the mounting assembly, fender, and casing 21. Cable 34 is then threaded into sleeve 50 and the latter is forced into elastic extension 45 to form a tight seal between cable 50 and nipple 40. Sleeve 50 is then held against movement by a clamp 51 secured to fender 15.

Thus, a moisture, grease, and dust proof seal is provided between casing 21 and protective cable 50 in a simple, inexpensive, and effective manner.

While a specific embodiment of the invention has been shown and described in detail to illustrate the application of the invention principles, it will be understood that the invention may be embodied otherwise without departing from such principles.

What is claimed is:

1. For use with a motor-vehicle-surface mounted lamp of the type including a lamp casing and a hollow threaded stud projecting from said casing for insertion through a hole in the mounting surface to receive a nut threaded thereon to secure the lamp casing to the mounting surface, the stud having a lamp cable extending therethrough for connection of the lamp to an energizing circuit, and the cable, exteriorly of the stud, extending through a protective sleeve; a moisture, grease, and dust proof sealing enclosure comprising, in combination, a shallow, substantially flat dished washer for mounting on the lamp stud between the lamp securing nut and the mounting surface, said washer having a base engageable with the mounting surface and an outwardly projecting radial flange spaced axially from said base; and a generally cup shaped sealing nipple of elastic material arranged to embrace said washer and enclose the lamp securing nut, said washer, and the end of the lamp stud; said nipple having a groove in its inner surface spaced axially from its mounting surface engaging end a distance greater than the axial spacing of the washer flange and washer base arranged to receive and grip said flange whereby the portion of the nipple axially inwardly of said groove is compressed between the washer flange and the mounting surface, and being formed with an aperture arranged to tightly receive such protective sleeve.

2. For use with a motor-vehicle-surface mounted lamp of the type including a lamp casing and a hollow threaded stud projecting from said casing for insertion through a hole in the mounting surface to receive a nut threaded thereon to secure the lamp casing to the mounting surface, the stud having a lamp cable extending therethrough for connection of the lamp to an energizing circuit, and the cable, exteriorly of the stud, extending through a protective sleeve; a moisture, grease, and dust proof sealing enclosure comprising, in combination, a shallow, substantially flat dished washer for mounting on the lamp stud between the lamp securing nut and the mounting surface, said washer having a base engageable with the mounting surface and an outwardly projecting radial flange spaced axially from said base; and a generally cup shaped sealing nipple of elastic material arranged to embrace said washer and enclose the lamp securing nut, said washer, and the end of the lamp stud; said nipple having a rim portion whose inner diameter is less than the outer diameter of said washer and having a groove in its inner surface spaced axially from its mounting surface engaging end a distance greater than the axial spacing of the washer flange and washer base arranged to receive and grip said flange whereby the portion of the nipple axially inwardly of said groove is compressed between the washer flange and the mounting surface; said nipple being formed with an aperture arranged to tightly receive such protective sleeve.

3. For use with a motor-vehicle-surface mounted lamp of the type including a lamp casing and a hollow threaded stud projecting from said casing for insertion through a hole in the mounting surface to receive a nut threaded thereon to secure the lamp casing to the mounting surface, the stud having a lamp cable extending therethrough for connection of the lamp to an energizing circuit, and the cable, exteriorly of the stud, extending through a protective sleeve; a moisture, grease, and dust proof sealing enclosure comprising, in combination, a shallow, substantially flat dished washer for mounting on the lamp stud between the lamp securing nut and the mounting surface, said washer having a base engageable with the mounting surface and an outwardly projecting radial flange spaced axially from said base; a generally cup shaped sealing nipple of elastic material arranged to embrace said washer and enclose the lamp securing nut, said washer, and the end of the lamp stud; said nipple having a groove in its inner surface spaced axially from its mounting surface engaging end a distance greater than the axial spacing of the washer flange and washer base arranged to receive and grip said flange whereby the portion of the nipple axially inwardly of said groove is compressed between the washer flange and the mounting surface, and being formed with a tubular lateral extension integral therewith arranged to tightly receive such protective sleeve.

4. For use with a motor-vehicle-surface mounted lamp of the type including a lamp casing and a hollow threaded stud projecting from said casing for insertion through a hole in the mounting surface to receive a nut threaded thereon to secure the lamp casing to the mounting surface, the stud having a lamp cable extending therethrough for connection of the lamp to an energizing circuit, and the cable, exteriorly of the stud, extending through a protective sleeve; a moisture, grease, and dust proof sealing enclosure comprising, in combination, a shallow, substantially flat dished washer for mounting on the lamp stud between the lamp securing nut and the mounting surface, said washer having a base engageable with the mounting surface and an outwardly projecting radial flange spaced axially from said base; and a generally cup shaped sealing nipple of elastic material arranged to embrace said washer and enclose the lamp securing nut, said washer, and the end of the lamp stud; said nipple having a rim portion whose inner diameter is less than the outer diameter of said washer and having a groove in its inner surface spaced axially from its mounting surface engaging end a distance greater than the axial spacing of the washer flange and washer base arranged to receive and grip said flange whereby the portion of the nipple axially inwardly of said groove is compressed between the washer flange and the mounting surface; said nipple being formed with a tubular lateral extension integral therewith arranged to tightly receive such protective sleeve.

References Cited in the file of this patent

UNITED STATES PATENTS

| 2,468,225 | Murphy | Apr. 26, 1949 |
| 2,637,804 | Hollins | May 5, 1953 |